United States Patent
Keese et al.

(10) Patent No.: US 7,444,885 B2
(45) Date of Patent: *Nov. 4, 2008

(54) VORTEX FLOW MEASURING INSTRUMENT

(75) Inventors: Dieter Keese, Wahlsburg (DE); Frank Buhl, Rosdorf (DE)

(73) Assignee: ABB Patent GmbH, Ladenburg (DE)

( * ) Notice: Subject to any disclaimer, the term of this patent is extended or adjusted under 35 U.S.C. 154(b) by 26 days.

This patent is subject to a terminal disclaimer.

(21) Appl. No.: 11/643,500

(22) Filed: Dec. 21, 2006

(65) Prior Publication Data

US 2007/0220994 A1    Sep. 27, 2007

(30) Foreign Application Priority Data

Dec. 23, 2005   (DE)   ................ 10 2005 061 835
Feb. 2, 2006    (DE)   ................ 10 2006 004 757

(51) Int. Cl.
*G01F 1/32*   (2006.01)
(52) U.S. Cl. .................................... 73/861.22
(58) Field of Classification Search ............ 73/861.22
See application file for complete search history.

(56) References Cited

U.S. PATENT DOCUMENTS

| | | | | |
|---|---|---|---|---|
| 4,003,255 A | * | 1/1977 | Spencer | 73/861.71 |
| 4,452,176 A | * | 6/1984 | Hoefelmayr et al. | 119/14.17 |
| 4,782,709 A | * | 11/1988 | Goto et al. | 73/861.12 |
| 4,912,838 A | * | 4/1990 | Goto et al. | 73/861.12 |
| 5,247,837 A | * | 9/1993 | Corpron | 73/861.12 |
| 5,280,727 A | * | 1/1994 | Hafner et al. | 73/861.12 |
| 5,367,906 A | * | 11/1994 | Tsuruoka et al. | 73/204.27 |
| 5,520,058 A | * | 5/1996 | Campbell et al. | 73/861.08 |
| 5,557,051 A | * | 9/1996 | Schalk | 73/861.22 |
| 5,627,322 A | * | 5/1997 | Osterloh | 73/861.22 |
| 6,912,918 B1 | * | 7/2005 | Lynnworth et al. | 73/861.26 |
| 7,272,978 B2 | * | 9/2007 | Keese et al. | 73/861.12 |
| 2006/0150746 A1 | * | 7/2006 | Keese et al. | 73/861.12 |
| 2007/0163360 A1 | * | 7/2007 | Baecker et al. | 73/861.12 |
| 2007/0199388 A1 | * | 8/2007 | Furkert et al. | 73/861.57 |

* cited by examiner

*Primary Examiner*—Harshad Patel
(74) *Attorney, Agent, or Firm*—Paul R. Katterle; Michael C. Prewitt

(57) ABSTRACT

The vortex flow meter provides a surface which is simple but nevertheless resistant to the substances to be measured. All parts of the measurement tube of the vortex flow meter which come in contact with the substance to be measured are coated with a less noble material, which is resistant to the respectively relevant substance to be measured, the basic material not having this resistance.

4 Claims, 1 Drawing Sheet

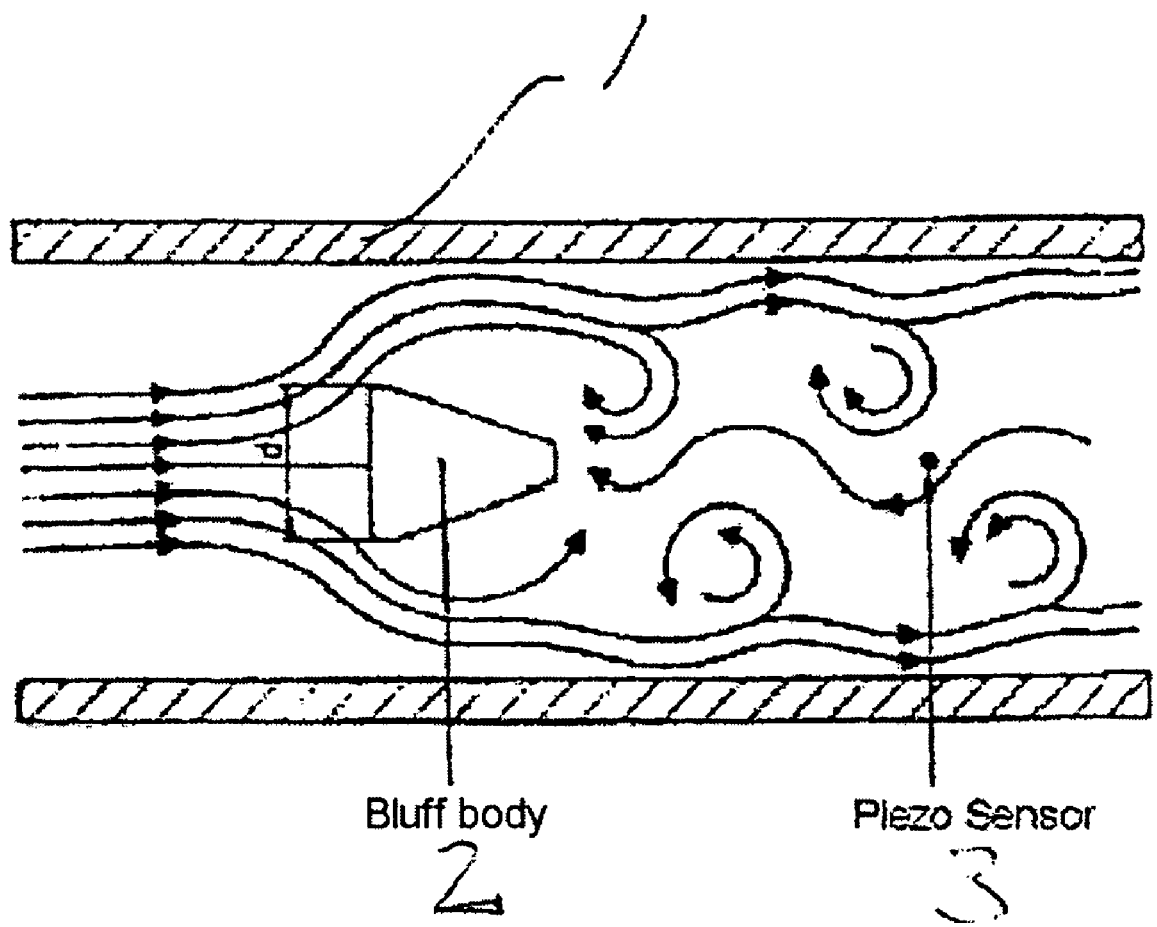

VORTEX FLOW MEASURING INSTRUMENT

CROSS REFERENCE TO RELATED APPLICATIONS

This application claims priority from German Application Nos. DE 10 2005 061 835.9 filed on Dec. 23, 2005 and DE 10 2006 004 757.5 filed on Feb. 2, 2006 the contents of which are relied upon and incorporated herein by reference in their entirety, and the benefit of priority under 35 U.S.C. 119 is hereby claimed.

BACKGROUND OF THE INVENTION

The invention relates to a vortex flow measuring instrument in the manner of so-called vortex flow meters.

The invention relates here as an example to the known measurement principle which is employed in vortex flow meters (VFMs).

The invention is based on vortex flow meters (vortex meters) which are nowadays used to determine volume flow or flow rate. Vortex flow meters can measure the flow of gases, steam and liquids in a wide measurement range, independently of the substance properties. The function of the vortex flow meter is based on the Karman vortex street. At the bluff body past which the medium flows, reciprocal vortices are formed on both sides. Owing to the flow, the vortices are shed and a vortex street (Karman vortex street) is formed.

The frequency f of the vortex shedding is proportional to the flow rate v and indirectly proportional to the width of the bluff body d:

$$f = St * v/d$$

The Strouhal number, denoted as St, is a dimensionless parameter which critically determines the quality of the vortex flow measurement. With suitable dimensioning of the bluff body, St behaves constantly over a very wide range of the Reynolds number Re $$Re = v * D/\upsilon$$

$\upsilon$=kinematic viscosity
v=flow rate
D=inner diameter of the measurement tube
St=Strouhal number The vortex shedding frequency to be evaluated is consequently now dependent only on the flow rate and independent of the density of the substance to be measured and the viscosity. The local pressure changes involved in the vortex shedding are usually detected by a piezo sensor and converted into electrical pulses corresponding to the vortex frequency. This frequency signal is processed further and conditioned in the measuring transducer.

The measurement signal of the vortex meter is the frequency of the vortices shedding from a flow obstacle. This frequency is proportional to the flow over wide ranges of the flow.

Depending on the application, the components of the vortex flow meter are made of various materials or combinations (for example steel, chromium-nickel steels, Hastelloy, titanium or tantalum). In each case it is necessary to ensure that these materials, which come in contact with the medium to be measured, are resistant to the substance to be measured.

SUMMARY OF THE INVENTION

It is therefore an object of the invention to improve a vortex flow measuring instrument so that, in respect of the entire region coming in contact with the substance to be measured, a durable instrument is uniformly provided for all possible applications.

The invention is based on the vortex flow meter and all parts of the flow meter which come in contact with the substance to be measured being coated with an inexpensive material, which is resistant to the respectively relevant substance to be measured, the basic material not having this resistance.

BRIEF DESCRIPTION OF THE DRAWING

The FIGURE shows a sectional schematic view of a portion of a vortex flow meter.

DETAILED DESCRIPTION OF ILLUSTRATIVE EMBODIMENTS

The components of the vortex flow meter that are coated with the resistant material include the measurement tube 1 internally, as well as the surfaces of the bluff body 2 and of the sensor 3 and, if further electrodes which come in contact with the substance to be measured are provided, then these also. What is important here is the continuous coating of ALL parts which come in contact with the substance to be measured.

The coating may comprise
plastic coatings
nitrate coatings
ceramic coatings

All other parts which come in contact with the substance to be measured may likewise be coated, if the basic material of these parts is not resistant to the substance to be measured. The basic material of all other parts coming in contact with the substance to be measured also needs no modification. In respect of applying the DGRL for vortex flow meters, this is significant for the substrate material of the measurement tube.

The invention also makes it possible to use inexpensive materials as basic material for vortex flow meters and all parts which come in contact with the substance to be measured, depending on the case in point.

The principle of coating allows the applicability of vortex flow meters to be extended inexpensively and made more flexible. For instance, the basic equipment may be modified for new measurement tasks which currently require elaborate and expensive special designs and materials.

The invention claimed is:

1. A vortex flow measuring instrument comprising, a tube, a bluff body, and a sensor, wherein all parts of said tube, said bluff body and said sensor which come in contact with a substance to be measured are provided with a coating formed of a material that is less noble than the material of said tube, said bluff body, and said sensor; said coating being resistant to the substance to be measured, the material of said tube, said bluff body and said sensor not being resistant to the substance to be measured.

2. The instrument as claimed in claim 1, wherein the coatings are plastic coatings.

3. The instrument as claimed in claim 1, wherein the coatings are nitrate coatings.

4. The instrument as claimed in claim 1, wherein the coatings are ceramic coatings.

* * * * *